United States Patent
Kurohata et al.

(10) Patent No.: US 7,404,777 B2
(45) Date of Patent: Jul. 29, 2008

(54) POWER TRANSMISSION INCORPORATING TENSIONER LEVER

(75) Inventors: Junya Kurohata, Osaka (JP); Tatsuya Konishi, Osaka (JP); Hiroshi Hashimoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 439 days.

(21) Appl. No.: 11/135,532

(22) Filed: May 23, 2005

(65) Prior Publication Data

US 2006/0040775 A1 Feb. 23, 2006

(30) Foreign Application Priority Data

Aug. 19, 2004 (JP) ............................. 2004-239739

(51) Int. Cl.
*F16H 7/08* (2006.01)

(52) U.S. Cl. ...................................... 474/111

(58) Field of Classification Search ................ 474/101, 474/109, 110, 111, 140
See application file for complete search history.

(56) References Cited

U.S. PATENT DOCUMENTS

| | | | |
|---|---|---|---|
| 3,115,046 A * | 12/1963 | Bliss et al. .................. 474/111 |
| 4,177,689 A * | 12/1979 | Zeilinger et al. ............... 474/87 |
| 5,246,404 A * | 9/1993 | Ojima ......................... 474/111 |
| 5,702,318 A | 12/1997 | Hayafune et al. |
| 5,967,922 A * | 10/1999 | Ullein et al. ................. 474/111 |
| 6,322,470 B1 | 11/2001 | Markley et al. |
| 2002/0160868 A1* | 10/2002 | Wigsten et al. .............. 474/101 |
| 2006/0270502 A1* | 11/2006 | Markley et al. ............. 474/111 |
| 2006/0276285 A1* | 12/2006 | Markley et al. ............. 474/111 |
| 2007/0066428 A1* | 3/2007 | Tryphonos .................. 474/111 |
| 2007/0142146 A1* | 6/2007 | Tryphonos .................. 474/111 |

FOREIGN PATENT DOCUMENTS

| | | | |
|---|---|---|---|
| JP | 58200841 A | * | 11/1983 |
| JP | 61 154355 | | 9/1986 |
| JP | 2000-274500 | | 10/2000 |
| JP | 3448122 | | 7/2003 |

* cited by examiner

*Primary Examiner*—Vicky A Johnson
(74) *Attorney, Agent, or Firm*—Howson & Howson LLP

(57) ABSTRACT

In a tensioner lever assembly for a chain transmission, an auxiliary lever, arranged to pivot relative to a main tensioner lever, engages a free span of the chain approaching the main lever from a driving sprocket. The auxiliary lever can be pivoted coaxially with the main lever, and can extend either toward the center of the main lever, or toward the driving sprocket. Alternatively, the auxiliary lever can be pivoted on the main lever at a location remote from the pivot axis of the main lever, and engaged with a free span of the chain moving away from the main tensioner lever and approaching a driven sprocket.

2 Claims, 4 Drawing Sheets

POWER TRANSMISSION INCORPORATING TENSIONER LEVER

FIELD OF THE INVENTION

This invention relates to tensioner levers, of the kind used in the timing drive of an automobile engine to maintain tension in the drive chain or other endless, travelling transmission medium which transmits rotational power from a crankshaft sprocket to one or more camshaft sprockets. The invention has application not only in engine timing drives but also in various other transmissions utilizing endless, traveling transmission media, such as roller chains, silent chains, toothed belts, etc.

BACKGROUND OF THE INVENTION

FIG. 5 illustrates an example of an timing transmission for an internal combustion engine, in which a tensioner lever is used to prevent both excess tension and excess slack in a silent chain. The tensioner lever 500 comprises an arm 510, pivotable on a pivot shaft P adjacent one end of the lever, and a shoe member 520, which extends from one end of the arm 510 toward the other end. The shoe is in contact with a portion of chain C on the slack side, i.e., the side at which the chain travels from a driving sprocket S1 toward a driven sprocket S2. The lever is provided with a pad 511, which is engageable with the plunger of a tensioner (not shown), which exerts a force against the lever, urging it against the chain. The slack side of the chain has two free span regions, designated FS, where the chain C is not in contact with the lever, a sprocket, or any other parts, one such region extending from the point at which the chain begins to disengage from sprocket S1 to the point at which the chain first contacts the shoe 520, and the other extending from the point at which the chain disengages from shoe 520 to the point at which the chain is fully engaged with sprocket S2. These free span regions FS ensure a degree of freedom in the path of the transmission chain C. The tensioner lever 500 is described in Japanese patent publication No. 3448122 (page 1, FIGS. 1 to 4)

Chord vibration can occur in the free span regions FS, where the chain is not in contact with other parts. Such vibration produces vibration noise, and can also result in backlash. Backlash, when intensified, causes the chain to impact against the tensioner lever itself, resulting not only in the production of impact noise, but also in increased wear of the shoe of the tensioner lever.

Backlash in the transmission chain can be reduced by increasing the pressing force applied by the tensioner to the chain. However, although such a measure can reduce backlash, it leads to excessive wear of the transmission chain and the shoe of the tensioner lever.

The main object of this invention is to provide a tensioner lever, which can prevent impact noise, vibration noise, and wear damage to the tensioner shoe, by suppressing backlash in the free span regions of the transmission medium.

SUMMARY OF THE INVENTION

The power transmission in accordance with the invention comprises an endless, flexible, traveling transmission medium arranged to transmit rotational power from a driving sprocket to at least one driven sprocket. A main tensioner lever is in sliding engagement with a part of the length of the transmission medium which extends from the driving sprocket to the driven sprocket on the side of said transmission in which the transmission medium moves from the driving sprocket toward the driven sprocket. This lever is elongated along the direction of the length of the transmission medium, and has first and second opposite ends. The lever is pivoted on a pivot axis for movement in a direction to increase tension in said length of the transmission medium, and an auxiliary lever having an arc-shaped surface is in sliding engagement with another part of said length of the transmission medium. The auxiliary lever is attached, and pivotable relative to, the main tensioner lever, adjacent one of the first and second ends of the main tensioner lever.

Preferably, the length of the auxiliary lever along the direction of said length of the transmission medium is shorter than the length of the main tensioner lever extending from the first end thereof to the second end thereof.

Backlash of the transmission medium in the free span is suppressed by abutment of the free span with the arc-shaped auxiliary lever, which can move relative to the main lever. Thus, vibration noise, impact noise due to backlash in the free span region of the transmission medium, and damage to the shoe due to excessive wear, can be prevented.

Especially where the arc-shaped auxiliary lever is shorter than main lever, vibration noise, impact noise, and wear damage to the shoe can be significantly reduced without interference with the pivoting movement of the main lever.

DETAILED DESCRIPTION OF THE PREFERRED EMBODIMENTS

In a preferred tensioner lever according to the invention, an arc-shaped auxiliary lever is attached to at least one end of a pivoted, arc-shaped main lever. Both the main lever and the auxiliary lever are in sliding engagement with an endless, flexible, traveling transmission medium such as a transmission chain, transmitting power from a driving sprocket to one or more driven sprockets. Thus the tensioner lever of the invention suppresses vibration noise in the free span, and also suppresses backlash of the transmission medium in the free span so that impact noise can be prevented, and so that wear of the shoe on the main lever is suppressed. Any of various embodiments of the tensioner lever may be adopted.

The arc-shaped main lever and the arc-shaped auxiliary lever may take any of various forms. For example, in one form of lever, a synthetic resin shoe, on which the transmission medium slides, is integrally locked on a die-cast aluminum base, by hooks protruding from both sides of the shoe. In another form of lever, a metallic reinforcing plate is fitted into a longitudinal slot in a synthetic resin guide body on which the transmission chain slides. In still another form of lever, a core of a slide rail and a core of a rail support are integrated by sandwich molding, with a skin layer enclosing both cores.

Where an arc-shaped auxiliary lever is attached to at least one end of a main lever so that backlash of the transmission medium in a free span is suppressed, any of various arrangements of the arc-shaped main lever and the arc-shaped auxiliary lever may be used. For example, the arc-shaped auxiliary lever may protrude toward the center of the arc-shaped main lever or toward a sprocket. Auxiliary levers may be provided at both ends of the main lever. Either of the two auxiliary levers may protrude toward the center of the main lever, or toward an adjacent sprocket. The endless, flexible, traveling transmission medium can take any of various forms. For example the transmission medium can be a roller chain, a silent chain or the like, or a transmission belt such as a toothed belt or the like.

Figure 1:
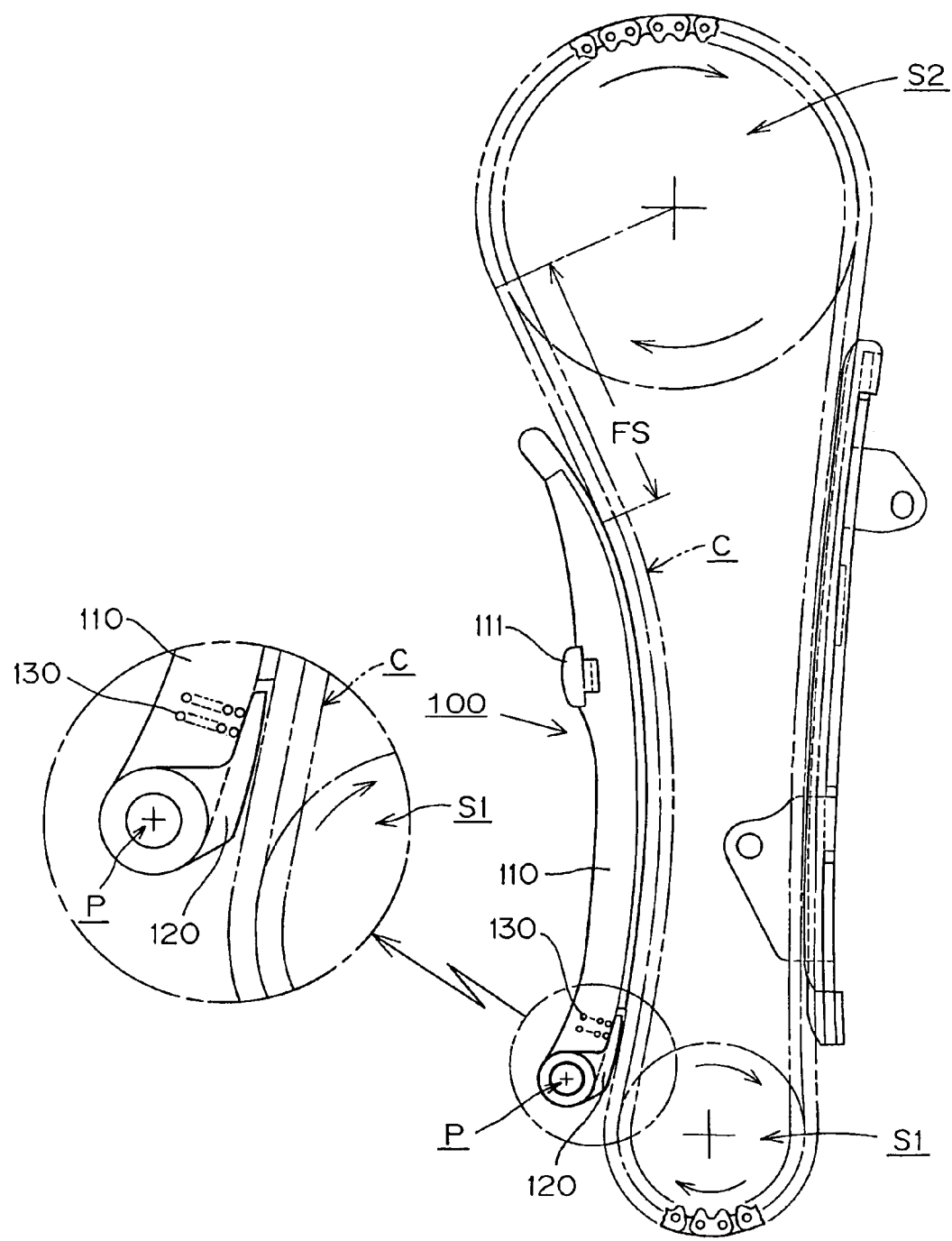
FIG. 1 is a front elevational view of a timing transmission, in which tension is maintained in a timing chain by a tensioner lever in accordance with a first embodiment of the invention, including an auxiliary, magnified view of the auxiliary lever.

As shown in FIG. 1, tensioner lever 100, which is the first example of the invention, is composed of an arc-shaped main lever 110 and an arc-shaped auxiliary lever 120, which is shorter than the main lever. These levers are pivoted, and press against a transmission medium C, which in the case of FIG. 1, is an endless silent chain engaged with a driving sprocket S1 and a driven sprocket S2 in a transmission device. The levers are both pivoted coaxially about a pivot shaft P to apply an appropriate tension force to the transmission medium C so that an elongation of the transmission medium is absorbed. The main lever is provided with a pad 111, which is engageable with the plunger of a tensioner (not shown).

The arc-shaped auxiliary lever 120, which is pivoted on shaft P along with the main lever 110, extends from the pivot shaft toward the center of the main lever 110. The auxiliary lever 120 is biased toward the transmission medium C by a coil spring 130, which is in compression, one end of the spring being seated in the lever 110 and the other end bearing against the auxiliary lever, and urging the auxiliary lever against the transmission medium C.

The arc-shaped auxiliary lever 120, which can move pivotably toward the transmission medium independently of the main lever, abuts the transmission medium C in a sliding contact relationship, being urged against the transmission medium by the compression spring 130. The auxiliary lever suppresses backlash in what would otherwise be a free span of the transmission medium extending from the point at which the transmission medium begins to disengage from the driving sprocket S1 and the point at which it begins to engage the shoe of the main lever. Consequently, vibration noise, and impact noise due to backlash in the free span approaching the main lever are prevented, damage of the shoe due to wear provided are also prevented.

Figure 2:
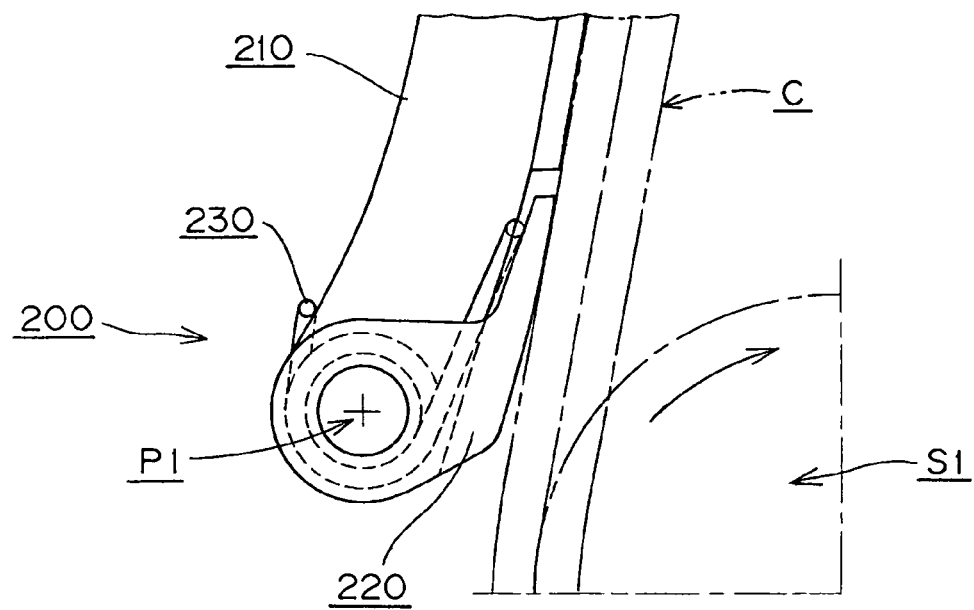
FIG. 2 is magnified fragmentary elevational view showing an auxiliary lever in accordance with a second embodiment of the invention.

In the second example of the invention, shown in FIG. 2, a lever assembly 200 comprises an arc-shaped main lever 210 and an arc-shaped auxiliary lever 220, which is shorter than the main lever 210, as in the case of the example shown in FIG. 1. The auxiliary lever 220 is similarly pivoted coaxially with the main lever 210, on a pivot shaft P, and extends toward the center of the main lever 210. Here, however, the auxiliary lever 220 is biased toward the transmission medium C by a spring 230 which is wound around pivot shaft P, one end of the spring being fixed to the main lever 210 and the other end bearing against the auxiliary lever 220, and urging the auxiliary lever toward the transmission medium C.

Except for the difference between the springs which urge the auxiliary lever toward the main lever, the tensioner lever assemblies of FIGS. 1 and 2 are similar, and function in the same manner.

Figure 3:
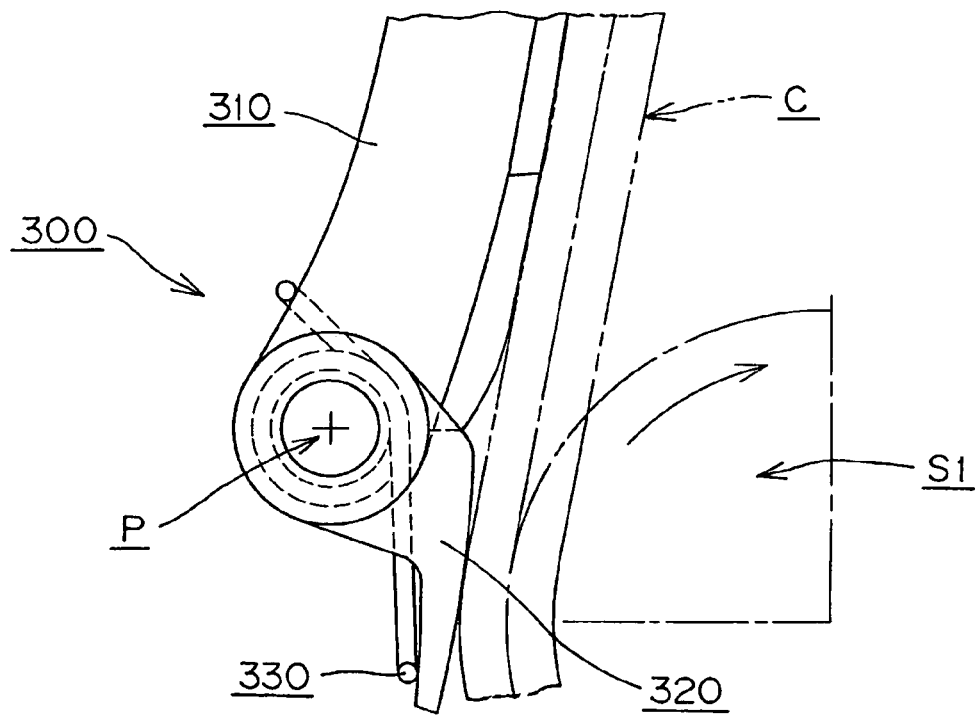
FIG. 3 is magnified fragmentary elevational view showing an auxiliary lever in accordance with a third embodiment of the invention.

In the embodiment illustrated in FIG. 3, which is a third example of the invention, a tensioner lever assembly 300 comprises an arc-shaped main lever 310 and an arc-shaped auxiliary lever 320, which is shorter than the main lever 310. Both levers are pivoted coaxially on a pivot shaft P, and both pivotably press against a portion of a transmission medium C which moves away from a driving sprocket S1. In this embodiment, the auxiliary lever 320 extends away from the pivot, and toward and past the location at which the transmission medium begins to disengage from the driving sprocket S1. The auxiliary lever 320 is biased toward the transmission medium C by a spring 330 wound around the pivot shaft P, with one end of the spring bearing against the outside of the main lever 310 and its other end bearing against the auxiliary lever 320.

In the embodiment of FIG. 3, the shoe of the main lever can extend to a location almost directly opposite the pivot axis of the levers, and the auxiliary lever can extend past the point at which the transmission medium begins to disengage from the driving sprocket. Thus, in this embodiment, nearly the entire free span of the transmission medium approaching the main tensioner lever 310 can be controlled, and vibration and backlash in the transmission medium C can be effectively suppressed so that the impact noise and vibration noise are prevented, and wear of the shoe of the main lever 310 can be prevented.

Figure 4:
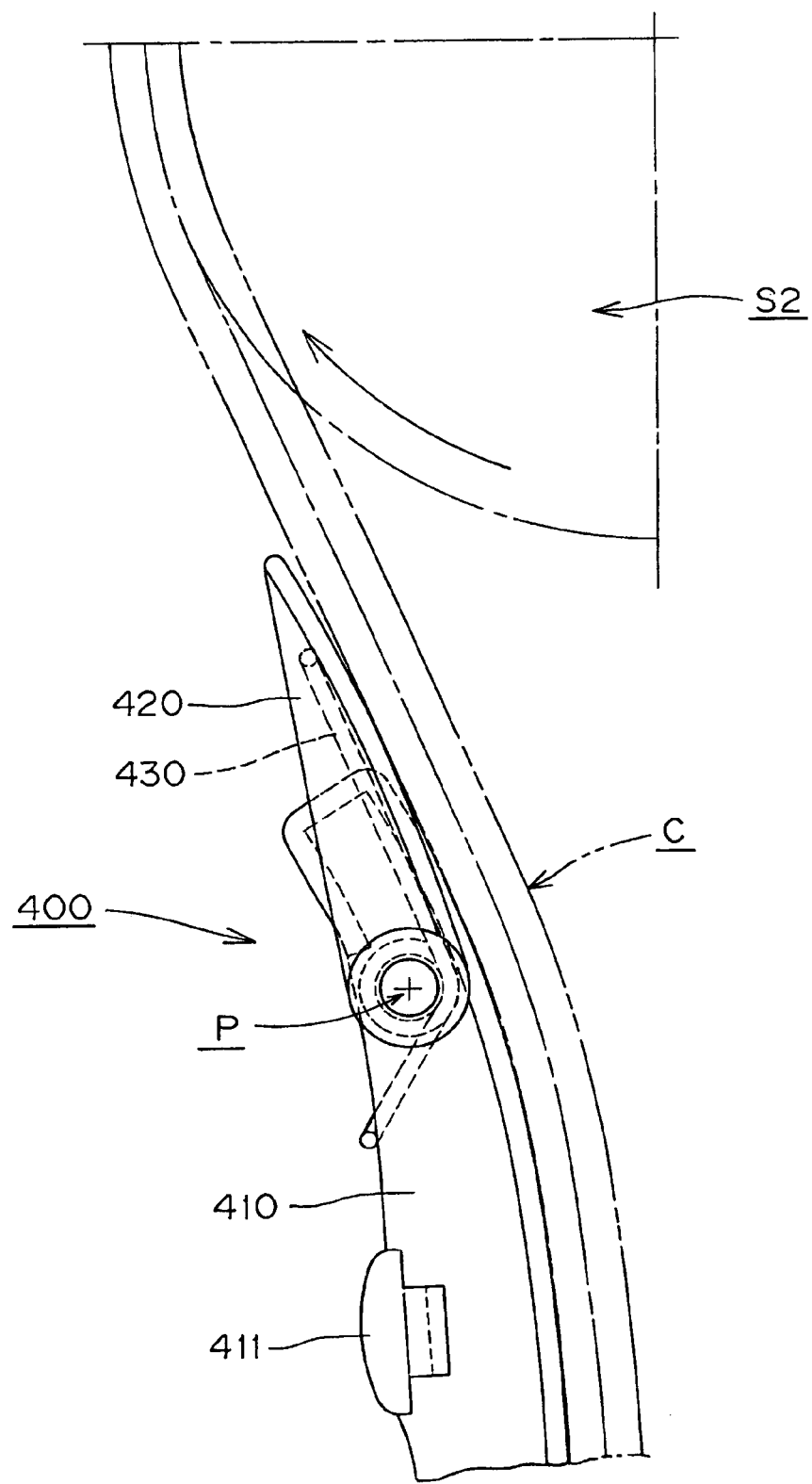
FIG. 4 is magnified fragmentary elevational view showing an auxiliary lever in accordance with a fourth embodiment of the invention.

In the embodiment of the invention illustrated in FIG. 4, a lever assembly 400 comprises an arc-shaped main lever 410 and an arc-shaped auxiliary lever 420, which is shorter than the main lever 410. The main lever pivotably presses against a transmission medium C about a pivot shaft (not shown in FIG. 4) to maintain tension and absorb elongation of the transmission medium.

Here the arc-shaped auxiliary lever 420 is attached to the main lever at a location near the end of the main lever which is remote from the pivot axis of the main lever. The auxiliary lever is pivoted on the main lever so that it can pivot relative to the main lever about a second pivot axis P near the end thereof remote from the main lever pivot axis. The auxiliary lever extends from its pivot axis P toward the location at which the transmission medium begins to engage with the a driven sprocket S2. The auxiliary lever 420 is biased toward the transmission medium C by a spring 430 one end of which bears against the outer part of the main lever 410 and the other end of which bears against the auxiliary lever 420.

Figure 5:
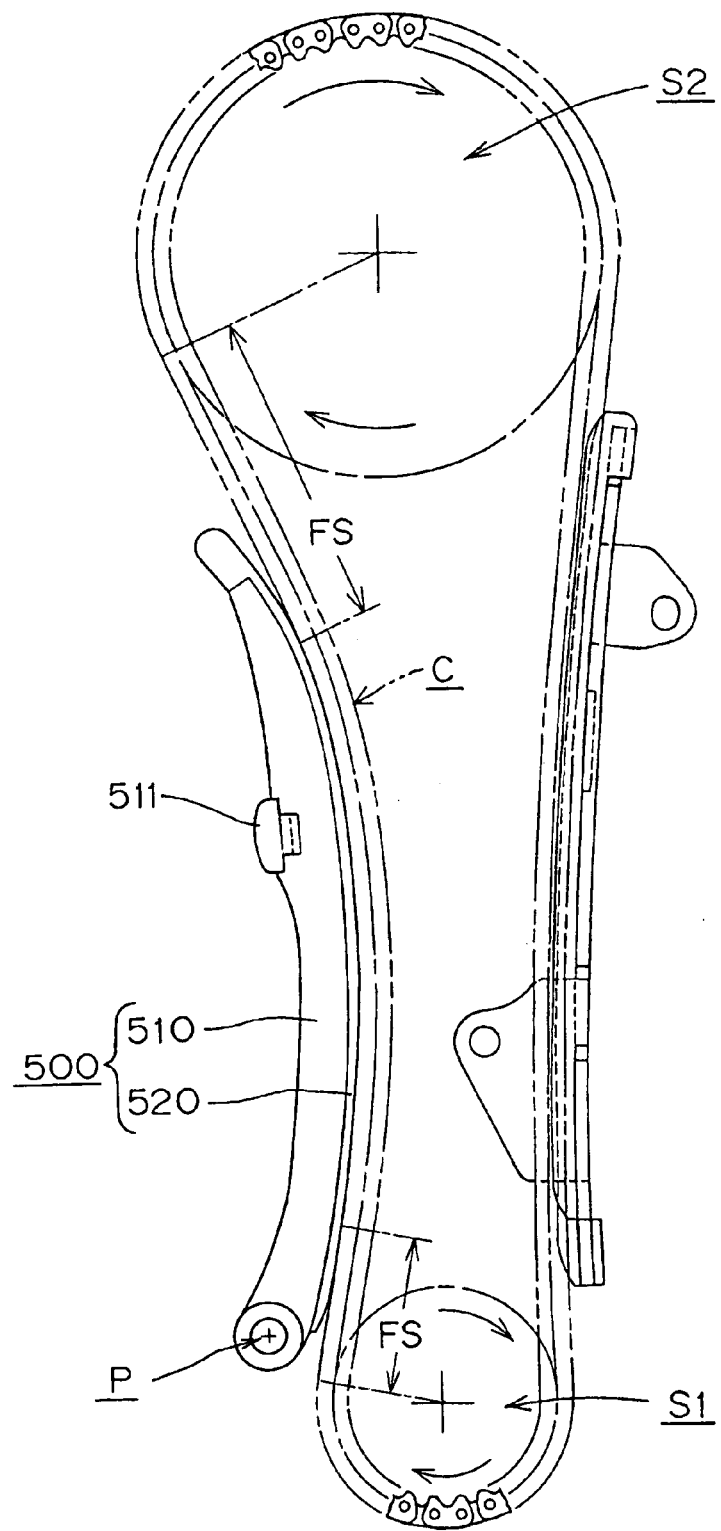
FIG. 5 is a front elevational view of a timing transmission, in which tension is maintained in a timing chain by a conventional tensioner lever.

A plunger engaging pad 411, corresponding to pad 111 in FIG. 5, is seen in FIG. 4.

In the embodiment shown in FIG. 4, backlash and vibration in the free span of the transmission medium moving from the main tensioner lever toward the driven sprocket are suppressed, impact noise due to backlash in this free span are prevented, and wear of the shoe on the main lever 410 can be prevented.

We claim:

1. A power transmission comprising:
    an endless, flexible, traveling transmission medium arranged to transmit rotational power from a driving sprocket to at least one driven sprocket;
    a main tensioner lever in sliding engagement with a first part of the length of said transmission medium extending from said driving sprocket to said driven sprocket on the side of said transmission in which the transmission medium moves from the driving sprocket toward said driven sprocket, said lever being elongated along the direction of said length of said transmission medium, having first and second opposite ends, and being pivoted on a pivot axis adjacent one of said first and second opposite ends for movement in a direction to increase tension in said length of said transmission medium;

an auxiliary lever having an arc-shaped surface in sliding engagement with a second part of said length of said transmission medium adjacent said one of the first and second ends of the main tensioner lever, said auxiliary lever also being pivoted on said pivot axis, and coaxially pivotable relative to said main tensioner lever; and a spring having a first end bearing against the main tensioner lever, and a second end bearing against the auxiliary lever, and exerting a force urging the arc-shaped surface of the auxiliary lever against said second part of said length of the transmission medium.

2. A power transmission according to claim 1, in which the length of said auxiliary lever along the direction of said length of said transmission medium is shorter than the length of said main tensioner lever extending from said first end thereof to said second end thereof.

\* \* \* \* \*

UNITED STATES PATENT AND TRADEMARK OFFICE
CERTIFICATE OF CORRECTION

PATENT NO. : 7,404,777 B2  Page 1 of 1
APPLICATION NO. : 11/135532
DATED : July 29, 2008
INVENTOR(S) : Junya Kurohata, Tatsuya Konishi and Hiroshi Hashimoto It is certified that error appears in the above-identified patent and that said Letters Patent is hereby corrected as shown below:

On the Title page Item (56); under "FOREIGN PATENT DOCUMENTS" add --JP 2005-036856  2/2005--.

Signed and Sealed this

Eighteenth Day of November, 2008

JON W. DUDAS
*Director of the United States Patent and Trademark Office*